United States Patent [19]

Miyashita

[11] Patent Number: 5,557,540
[45] Date of Patent: Sep. 17, 1996

[54] CODING AND TRANSMITTING SYSTEM

[75] Inventor: Atsushi Miyashita, Tokorozawa, Japan

[73] Assignee: Hitachi Denshi Kabushiki Kaisha, Tokyo, Japan

[21] Appl. No.: 251,302

[22] Filed: May 31, 1994

[30] Foreign Application Priority Data

May 31, 1993 [JP] Japan .................................. 5-127673

[51] Int. Cl.$^6$ ..................................................... G06F 17/00
[52] U.S. Cl. ...................................................... 364/514 R
[58] Field of Search ....................... 364/514 R; 375/376; 348/500; 331/1 A, 14, 17, 25

[56] References Cited

U.S. PATENT DOCUMENTS 3,840,821  10/1974  Conway .................................. 331/1 A
4,129,748  12/1978  Saylor ...................................... 375/376

*Primary Examiner*—Ellis B. Ramirez
*Attorney, Agent, or Firm*—Antonelli, Terry, Stout & Kraus

[57] ABSTRACT

The transmitter section has a coder for converting an image signal into the coded data and producing the coded data at its output, a timer for producing time information which indicates a time lapse from a reference time, a first time data adding unit for adding the time information from the timer as the first time data to the coded data from the coder, a transmitter-side buffer for writing and reading the coded data with the first time data added, and a second time data adding unit for adding the time information from the timer as the second time data to the coded data read from the transmitter-side buffer, and sending the coded data to the transmission path. The receiver section has a unit for detecting the second time data from the coded data which is transmitted through the transmission path, a receiver-side buffer for writing and reading the coded data transmitted through the transmission path, a unit for detecting the first time data from the coded data read from the receiver-side buffer, a unit for detecting a total time delay of the coded data in the transmitter and receiver section on the basis of the detected first and second time data, and a unit for controlling the phase of the coded data read from the receiver-side buffer in response to the total delay time of the coded data detected by the detecting means.

11 Claims, 14 Drawing Sheets

FIG.8A

ROM TABLE 71

| Vid : MORE SIGNIFICANT ADDRESS | Vt : LESS SIGNIFICANT ADDRESS | ROM DATA DDDD DDDD 7654 3210 |
|---|---|---|
| 0000 0000 ( 0 ) | 0000 0000 ( 0 ) | x x x x  x x 0 1 |
|  | 0000 0001 ( 1 ) |  |
|  | 0010 ( 2 ) |  |
|  | 0011 ( 3 ) |  |
|  | 0100 ( 4 ) |  |
|  | 0101 ( 5 ) | x x x x  x x 0 1 |
|  | 0110 ( 6 ) | x x x x  x x 0 0 |
|  | 0111 ( 7 ) | x x x x  x x 1 0 |
|  | 1000 ( 8 ) |  |
| 0000 0000 ( 0 ) | 1111 1111 (255) | x x x x  x x 1 0 |
| 0000 0001 ( 1 ) | 0000 0000 ( 0 ) | x x x x  x x 0 1 |
|  | 0000 0001 ( 1 ) |  |
|  | 0010 ( 2 ) |  |
|  | 0011 ( 3 ) |  |
|  | 0100 ( 4 ) |  |
|  | 0101 ( 5 ) | x x x x  x x 0 1 |
|  | 0110 ( 6 ) | x x x x  x x 0 1 |
|  | 0111 ( 7 ) | x x x x  x x 0 0 |
|  | 1000 ( 8 ) | x x x x  x x 1 0 |
| 0000 0001 ( 1 ) | 1111 1111 (255) | x x x x  x x 1 0 |
| 0000 0010 ( 2 ) | 0000 0000 ( 0 ) | x x x x  x x 0 1 |
|  | 0000 0001 ( 1 ) |  |
|  | 0010 ( 2 ) |  |
|  | 0011 ( 3 ) |  |
|  | 0100 ( 4 ) |  |
|  | 0101 ( 5 ) | x x x x  x x 0 1 |
|  | 0110 ( 6 ) | x x x x  x x 0 1 |
|  | 0111 ( 7 ) | x x x x  x x 0 1 |
|  | 1000 ( 8 ) | x x x x  x x 0 0 |
|  | 1001 ( 9 ) | x x x x  x x 1 0 |
| 0000 0010 ( 2 ) | 1111 1111 (255) | x x x x  x x 1 0 |
| 0000 1010 ( 10) | 0000 0000 ( 0 ) | x x x x  x x 0 1 |
|  | 0000 0001 ( 1 ) |  |
|  | 1100 ( 12) |  |
|  | 1101 ( 13) |  |
|  | 1110 ( 14) | x x x x  x x 0 1 |
|  | 0000 1111 ( 15) | x x x x  x x 0 1 |
|  | 0001 0000 ( 16) | x x x x  x x 0 0 |
|  | 1000 ( 17) | x x x x  x x 1 0 |
|  | 1001 ( 18) | x x x x  x x 1 0 |
| 0000 1010 ( 10) | 1111 1111 (255) | x x x x  x x 1 0 |

FIG.8B

ROM TABLE 71

| Vid : MORE SIGNIFICANT ADDRESS | Vt : LESS SIGNIFICANT ADDRESS | ROM DATA DDDD DDDD 7654 3210 |
|---|---|---|
| ⎡ 0010 1000 ( 40) | 0000 0000 ( 0 ) | x x x x  x x 0 1 |
| | 0000 0001 ( 1 ) | |
| | ⋮ | |
| | 0000 1111 ( 15) | |
| | 0001 0000 ( 16) | |
| | ⋮ | |
| | 0001 1111 ( 31) | |
| | 0010 0000 ( 32) | |
| | ⋮ | |
| | 0010 1000 ( 40) | x x x x  x x 0 1 |
| | 0010 1001 ( 41) | x x x x  x x 0 1 |
| | 0010 1010 ( 42) | x x x x  x x 0 1 |
| | 0010 1011 ( 43) | x x x x  x x 0 1 |
| | 0010 1100 ( 44) | x x x x  x x 0 1 |
| | 0010 1101 ( 45) | x x x x  x x 0 1 |
| | 0010 1110 ( 46) | x x x x  x x 0 0 |
| | 0010 1111 ( 47) | x x x x  x x 1 0 |
| | ⋮ | |
| ⎣ 0010 1000 ( 40) | 1111 1111 (255) | x x x x  x x 1 0 |
| ⎡ 0010 1001 ( 41) | 0000 0000 ( 0 ) | x x x x  x x 0 1 |
| | ⋮ | |
| | 0010 1001 ( 41 ) | x x x x  x x 0 0 |
| | ⋮ | |
| ⎣ 0010 1001 ( 41) | 1111 1111 (255) | x x x x  x x 1 0 |
| ⎡ 0010 1001 ( 42) | 0000 0000 ( 0 ) | x x x x  x x 0 1 |
| | ⋮ | |
| | 0010 1001 ( 41) | x x x x  x x 0 0 |
| | ⋮ | |
| ⎣ 0010 1001 ( 41) | 1111 1111 (255) | x x x x  x x 1 0 |
| ⎡ 1111 1111 (255) | 0000 0000 ( 0 ) | x x x x  x x 0 1 |
| | ⋮ | |
| | 0000 0101 ( 05) | x x x x  x x 0 0 |
| | ⋮ | |
| ⎣ 1111 1111 (255) | 1111 1111 (255) | x x x x  x x 1 0 |

FIG.10A
| VH1 PULSE | VH2 PULSE | D1' | D0' | |
|---|---|---|---|---|
| 0 | 0 | 0 | 0 | NORMAL |
| | | 1 | 0 | NORMAL |
| | | 0 | 1 | NORMAL |
| 0 | 1 | 0 | 0 | NORMAL |
| | | 1 | 0 | NORMAL |
| | | 0 | 1 | REPLACE BY STC |
| 1 | 0 | 0 | 0 | NORMAL |
| | | 1 | 0 | REPLACE ONLY STC BY OTHER CODE |
| | | 0 | 1 | NORMAL |
FIG.10B(a) CODED DATA 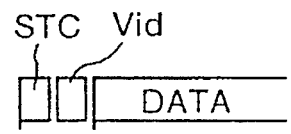
FIG.10B(b) VH1 PULSE 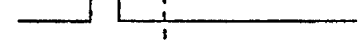
FIG.10B(c) VH2 PULSE 

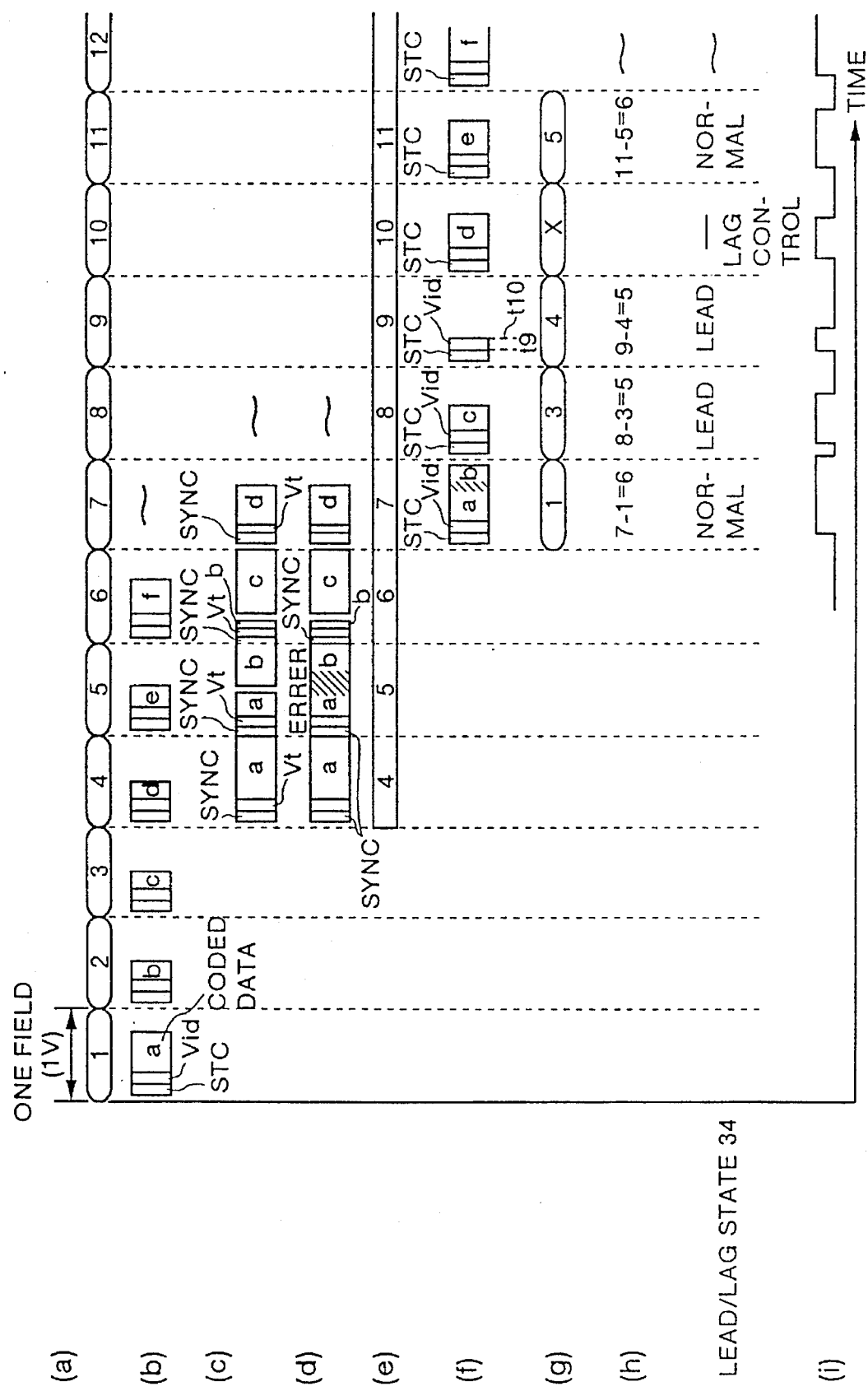

CODING AND TRANSMITTING SYSTEM

BACKGROUND OF THE INVENTION

1. Field of the Invention

This invention relates to a coding and transmitting system for coding, transmitting and then decoding an image signal.

2. Description of the Related Art

Recently, the technology of moving image signal compression has been remarkably progressed. In addition, LSI and so on to realize this technology have been developed and used in the data base and digital transmission of moving images.

The moving image signal compression technology includes coding techniques such as Huffman coding, motion adaptive coding and discrete cosine transform coding (called DCT). The moving image signal, when compressed, becomes coded data of an indefinite length.

For example, in the Huffman coding, the code of a value occurring at a high probability is converted into a short-value code, so that the amount of data can be reduced. However, a code of a value which is predicted to occur at a low probability depending on the moving image sometimes frequently occurs, changing the amount of data after coding.

In addition, in the motion adaptive coding, the image signal data itself of each field is not coded but the differential image data between fields is coded and transmitted as image data corresponding to a movement. Thus if the image little changes with time, or is almost still, the differential image data between fields is little and the coded data also less occurs. However, as to the moving image, much image data occurs and thus the amount of coded data is greatly changed depending on the situations.

FIG. 1 shows an example of the conventional coding and transmitting system. Referring to FIG. 1, on the transmitter section, an image signal is supplied through an image signal input terminal 101 to a coder 102, where it is converted into coded data 120 of an indefinite length. The coded data is supplied to a transmitter-side buffer (T-buffer) (actually a buffer memory) 104.

The transmitter-side buffer 104 stores only a necessary part of the coded data 120 and then reads it at a constant rate. The read data, 150 is supplied to a transmitter-section side transmitter (T-transmitter) 107, and thereby converted into transmission data of a constant rate, which is transmitted from a transmission data output terminal 108 through a transmission path 116 to the receiver section.

The transmission data transmitted through the transmission path 116 is fed through a transmission data input terminal 109 to a receiver-section side transmitter (R-transmitter) 110. The R-transmitter 110 converts the transmission data back to coded data 151 of a constant rate and then supplies it to a receiver-side buffer (R-buffer) 112, where it is stored at a constant rate. Then, the receiver-side buffer 112 responds to a data request signal from a decoder 114 to supply coded data 152 of an indefinite length to the decoder 114. The decoder 114 decodes the coded data 152 into the image signal of each field and produces it at an image signal output terminal 115.

The transmitter section also has a controller 118T for controlling the timing of the operation of the whole transmitter section. Similarly, the receiver section has a controller 118R for controlling the timing of the operation of the whole receiver section. Each of these controllers generates a start control signal for starting the operation and also a clock signal.

The operation of the conventional coding and transmitting system will be further described with reference to the timing chart of FIG. 2. The coded data of each field in this invention has at the beginning a control code (e.g. STC) which indicates a partition of coded data and which is added by the coder 102. The decoder 114 is controlled by the control code to derive from the buffer 112 the necessary coded data and to decode it into data of each field.

When a moving image signal is transmitted and so on, the period of data occurrence is constant but the amount of data is changed. Thus the image signal fed to the image signal input terminal 101 is converted by the coder 102 into the coded data 120 of an indefinite length which has a different amount of data at each V (every fields) as shown in FIG. 2 at (a). This coded data is supplied to the transmitter-side buffer 104.

The transmitter-side buffer 104 which is formed of an FIFO memory and so on stores a necessary part of the input coded data 120, or only the period in which coded data of an indefinite length occurs.

Then, the T-transmitter 107 reads out at a constant rate the coded data 150 of only the necessary part of coded data from the transmitter-side buffer 104 as shown in FIG. 2 at (b). Then, the T-transmitter 107 converts the coded data 150 of a constant rate into transmission data of a constant rate and sends it through the transmission data output terminal 108 to the transmission path 116.

In this case, it is necessary to monitor the amount of writing data in and reading from the transmitter-side buffer 104 and control the compression rate of the moving image signal, or the amount of generated coded data in order that the buffer 104 can be prevented from overflowing with data upon writing or contrarily supplying insufficient data upon reading.

Thus, since the coded data 150 is read at a constant rate from the transmitter-side buffer 104 when the transmission data is transmitted, the data rate of transmission data per unit time becomes constant. However, before the image signal is coded the field switching point of the image signal occurs at a constant period, and after it is coded and fed through the transmitter-side buffer 104 the switching point occurs at an indefinite period as will be understood from FIG. 2 at (b).

In the receiver section, the transmission data transmitted through the transmission path 116 is converted by the R-transmitter 110 into the coded data 151 of a constant rate. This coded data is fed to the receiver-side buffer 112 where it is temporarily stored at a constant rate. The decoder 114 reads out at the field period the necessary coded data 152 shown in FIG. 2 at (d) from the receiver-side buffer 112 and decodes it. At this time, the amount of coded data read from the receiver-side buffer 112 and fed to the decoder 114 has an indefinite length.

Since each of the buffers in the transmitter and receiver section writes and reads the coded data, a slight time is taken until the image signal is supplied, practically transmitted and decoded. Therefore, if the delay time of the coded data of each field in the transmitter-side buffer 104 is represented by Tn and that in the receiver-side buffer 112 by Xn, the total delay time Tn+Xn is constant in the coding and transmitting system independently of the situation of the image signal.

This aspect will be mentioned below. FIG. 2 is a timing chart of data in which the delay times Tn and Xn in the buffers are both, for example, 3 V period (three fields) (about 50 ms). The coded data a at the first field of the coded data 120 as shown in FIG. 2 at (a) is larger in its amount and so the first coded data a needs much time in being passed through the transmitter-side buffer 104. Therefore, the time in which the successive first and second coded data a and b are passed through the transmitter-side buffer 104 is increased by a time period Ta as shown in FIG. 2 at (b). Then, in the receiver section, the time taken for the coded data c to be fed to the receiver-side buffer 112 is thus delayed by the time period Ta. Consequently, the total delay time of Tn+Ta and Xn−Ta becomes constant Tn+Xn independently of the value of Ta since the lag in the transmitter-side buffer 104 and lead in the receiver-side buffer 112 can be canceled out.

The above description is concerned with the normal state in which no error is mixed into data under transmission. However, an error may occur between the transmitter section and the receiver section, or mixed into the transmission path to change part of the coded data. This case will be considered below.

It is assumed that as shaded in FIG. 2 at (c) an error or the like occurs to change the control code which indicates the partition between the coded data a and b. In this case, when decoding the image signal of coded data a, the decoder 14 of the receiver section reads out unnecessary part of coded data, or not only data a but also data b from the receiver-side buffer 112 by mistake as shown in FIG. 2 at (e).

The coded data c is decoded when the image signal of coded data d must be decoded and thereafter the following image signal is decoded one field out of phase in turn as shown in FIG. 2 at (e). As a result, while the average time in which data is passed through the receiver-side buffer is normally Xn, the pass time for the coded data c and the following is Xn-e, or changed away from the original value.

SUMMARY OF THE INVENTION

According to the aforesaid related art, when an error or the like is mixed into the coded data on the transmission path, the change of the length of coded data partitioned by the control code makes the average amount of data to be stored in the buffer different from the designed value. Thus under this situation a phenomenon occurs in which data is simultaneously written in and read from the same location of the receiver-side buffer after a certain time. Consequently, excessive or insufficient data is read from the receiver-side buffer, resulting in disturbing the decoded image.

In addition, when an error or the like is mixed into the coded data on the transmission path, it changes the total delay time of the coded data in the coding and transmitting system. A trouble is also caused when the coded data has not only the image data but also, for example, audio data and is transmitted in a similar way. When an error or the like is mixed into one of the image data and audio data, the image data and audio data are not synchronized with each other on the receive side.

Accordingly, it is an object of the invention to provide a coding and transmitting system capable of solving the problems with the related art.

It is another object of the invention to provide a coding and transmitting system capable of quickly restoring the total delay time to the normal delay time even if an error or the like is mixed into coded data on the transmission path to change the total delay time of the coded data in the coding and transmitting system.

It is still another object of the invention to provide a coding and transmitting system capable of quickly warning the operator of the change of the total delay time when an error or the like is mixed into coded data on the transmission path to change the total delay time of the coded data in the coding and transmitting system.

According to an aspect of the present invention, there is provided a coding and transmitting system having a transmitter section for coding an image signal into coded data and sending the coded data to a transmission path, and a receiver section for decoding the coded data transmitted through the transmission path into the image signal and producing the image signal at its output, wherein the transmitter section has a unit for adding time information to the coded data, and the receiver section has a unit for detecting the time information from the coded data with the time information added, a unit for detecting a total delay time of the coded data in the transmitter and receiver section on the basis of the detected time information, and a unit for controlling the phase of the coded data in response to the total delay time of the coded data detected by the detecting unit.

The phase control unit causes the phase of the coded data to lead when the detected total delay time of the coded data is larger than a predetermined delay time and to lag when the total delay time is smaller than the predetermined delay time.

According to another aspect of the present invention, there is provided a coding and transmitting system having a transmitter section for sending coded data to a transmission path and a receiver section for receiving the coded data transmitted through the transmission path, wherein the transmitter section has a coder for coding an image signal into the coded data of a variable length which includes a control code indicative of each partition of data, and producing the coded data at its output, a timer unit for producing time information indicative of a time lapse from a reference time point, a first time data adding unit for adding the time information from the timer unit as first time data to the coded data from the coder, a transmitter-side buffer for storing the coded data with the first time data added and reading the coded data at a constant rate, and a second time data adding unit for adding the time information from the timer unit as second time data to the coded data read from the transmitter-side buffer, and sending the coded data to the transmission path, and the receiver section has a unit for detecting the second time data from the coded data transmitted through the transmission path, a receiver-side buffer for storing the coded data of the constant rate transmitted through the transmission path and reading the coded data as coded data of a variable length which includes a control code indicative of each partition of the data, a unit for detecting the first time data from the coded data read from the receiver-side buffer, a unit for detecting a total delay time of the coded data in the transmitter and receiver section on the basis of the detected first and second time data, a unit for controlling the phase of the coded data read from the receiver-side buffer in response of the total delay time of the coded data detected by the detecting unit, and a unit for decoding the phase-controlled coded data into the image signal and producing the image signal at its output.

According to an example of the present invention, the phase control unit causes the phase of the coded data to lead when the detected total delay time of the coded data is larger by a certain amount than a predetermined delay time and to lag when the total delay time is smaller by the certain amount than the predetermined delay time. In addition, the predetermined delay time is substantially equal to the total delay time of the coded data in the transmitter-side buffer and receiver-side buffer.

According to still another aspect of the present invention, there is provided a coding and transmitting system having a transmitter section for coding an image signal into coded data and sending the coded data to a transmission path, and a receiver section for decoding the coded data transmitted through the transmission path into the image signal and producing the image signal at its output, wherein the transmitter section includes a unit for adding time information to the coded data, and the receiver section includes a unit for detecting the time information from the coded data with the time information added, a unit for detecting a total delay time of the coded data in the transmitter and receiver section on the basis of the detected time information, and a unit for warning the operator of a phase lead or lag of the coded data in response to the total delay time of the coded data detected by the detecting unit.

Thus, according to this invention, even if part of the signal in the coding and transmitting system is caused to change or drop out by an error or the like mixed into the system during the transmission, the time information added to the coded data is detected and used to correct the phase of the decoded output signal or warn the operator of the abnormal output phase, and therefore such an abnormal state of the phase of the coded data can be swiftly removed from the system.

BRIEF DESCRIPTION OF THE DRAWINGS

FIGS. 8A and 8B show one example of the ROM table of the discriminator of FIG. 7.

FIG. 10A shows the ROM table of the lead/lag controller of FIG. 9.

FIG. 10B is a timing chart to which reference is made in explaining the operation of the control code processor of FIG. 10A.

FIG. 11 is a timing chart of data at each part to which reference is made in explaining the operation of the coding and transmitting system of FIG. 3 at the time of data lead.

DESCRIPTION OF THE PREFERRED EMBODIMENTS

Embodiments of a coding and transmitting system of the invention will be described in detail with reference to the accompanying drawings.

Figure 3:
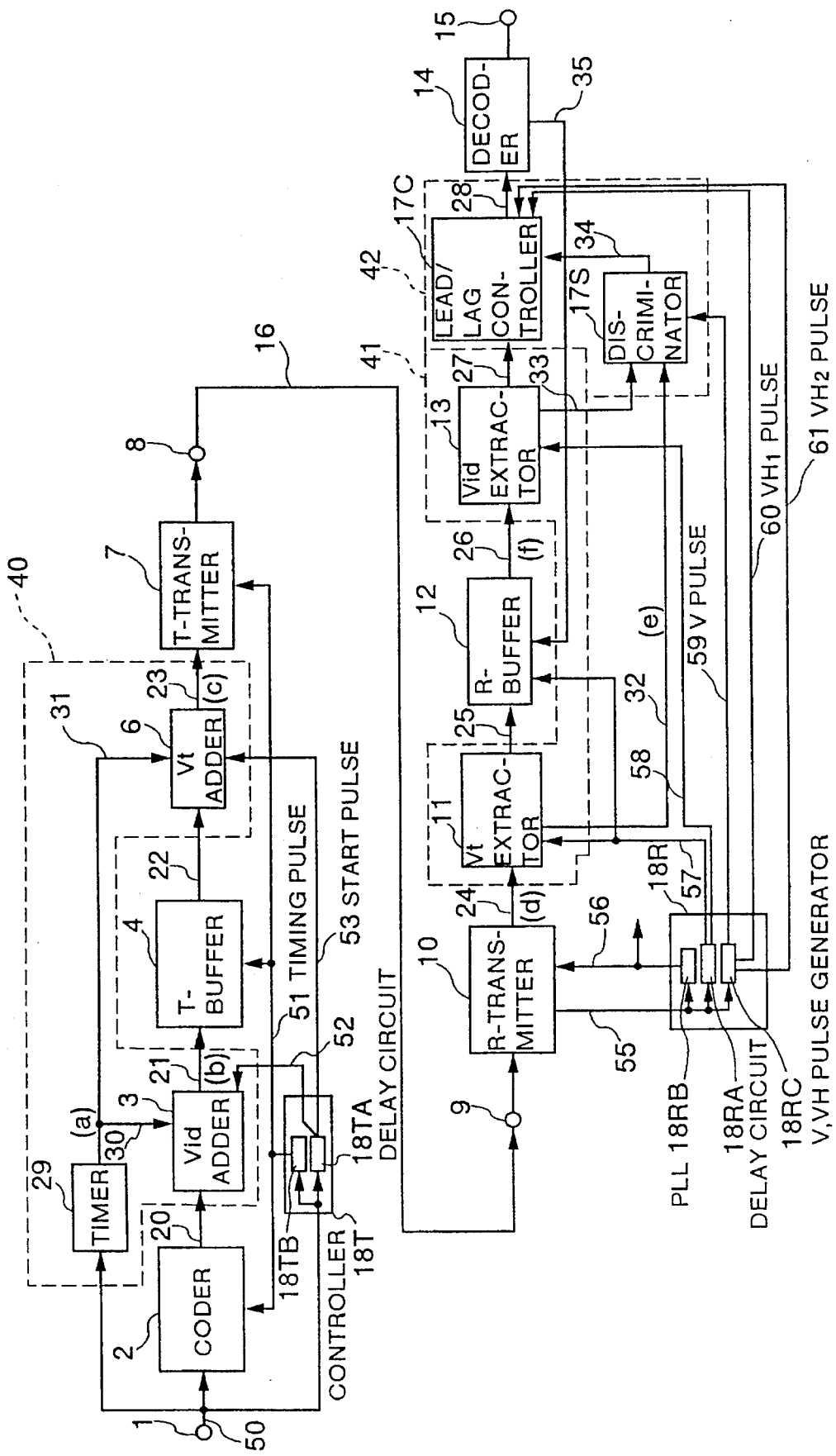
FIG. 3 is a block diagram of the arrangement of one embodiment of the coding and transmitting system of the invention.
Figure 4:
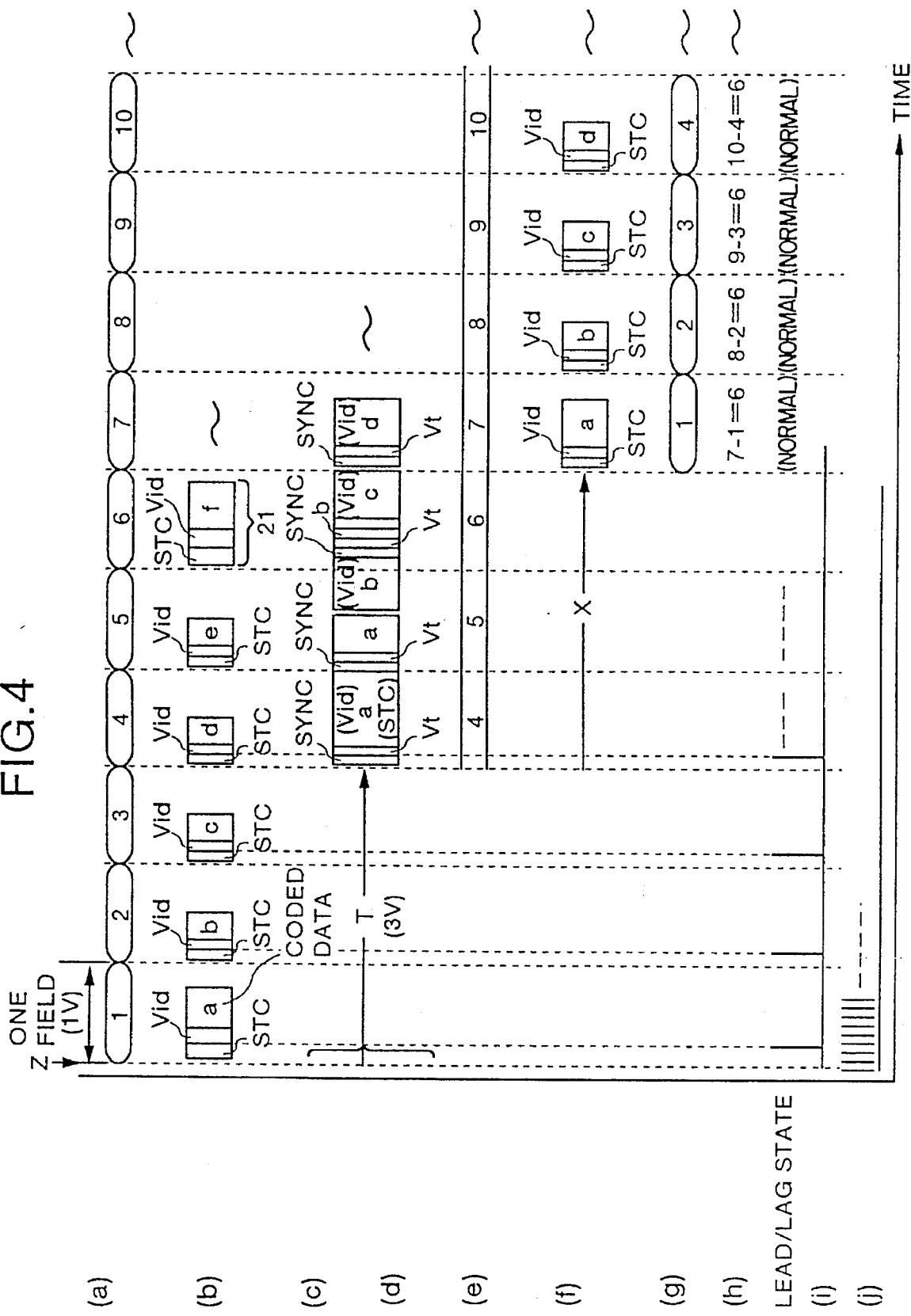
FIG. 4 is a timing chart of data at each part to which reference is made in explaining the operation of the coding and transmitting system of FIG. 3.

The first embodiment of the invention will first be mentioned with reference to FIGS. 3 through 12. FIG. 3 is a block diagram of the first arrangement of the invention. There is shown a time information adding portion 40 for adding time information Vid, Vt to coded data. This portion 40 is provided in the transmitter section of the related art. There are also shown a time information extracting portion 41 for extracting the time information and a delay detection adjusting portion 42 for correcting the coded data for error. These portions 41 and 42 are provided in the receiver section. FIG. 4 is a timing chart for the operation of this invention in which there is no transmission error.

Referring to FIG. 3, an image signal 50 is supplied through an image signal input terminal 1 to a coder 2. The input image signal is coded by the coder 2 into coded data of an indefinite length (for example, 8-bit parallel data) 20. This coded data 20 is produced at a constant period, for example, on a field unit basis or at every field from the coder 2 and fed to a time information (Vid) adder 3.

A timer 29 supplies to the Vid adder 3 time information Vid, 30 (FIG. 4 at (a)) which indicates the time at which the coded data is produced. This timer also supplies present time information Vt (usually Vt–Vid=T), 31 of the transmitter section to a time information Vt adder 6.

The Vid adder 3 adds the time information Vid 30 to the coded data 20 of a field unit and supplies at each field to a transmitter-side buffer (T-buffer) 4 the resulting coded data 21 (FIG. 4 at (b)) of an definite length with the coded data production time information Vid. At the input side of the transmitter-side buffer 4, the transmission rate of the coded data is not constant in each field period since the coded data of each field unit has an indefinite length.

The transmitter-side buffer 4 stores only the necessary portion, or compressed data of the coded data 21 with Vid which has coded data of an indefinite length. Then, the buffer 4 reads the stored coded data at a constant rate and supplies it as Vid-added coded data 22 to the Vt adder 6. Therefore, at the output side of the transmitter-side buffer 4 the data is continuously read out and thus the transmission rate in each field period is constant.

To the Vt adder 6 is supplied the present time information Vt 31 from the timer 29 and it is added to the Vid-added coded data 22. The output from the Vt adder 6 is supplied as Vid, Vt-added coded data 23 (FIG. 4 at (c)) to a transmitter-section side transmitter (T-transmitter) 7 at a constant rate.

At the T-transmitter 7 the Vt, Vid-added coded data 23 is converted from parallel data into serial data as a constant rate transmission data, which is fed to a receiver-section side transmitter (R-transmitter) 10 through a transmission data output terminal 8, a transmission path 16 and a transmission data input terminal 9 of the receiver section.

The R-transmitter 10 converts the serial transmission data back to the parallel data and supplies it to a time information Vt extractor or detector 11 as Vt, Vid-added constant rate coded data 24 (FIG. 4 at (d)).

The Vt extractor 11 extracts or detects the time information Vt from the Vt, Vid-added coded data 24. The resulting Vid-added coded data 25 produced as the first output from the Vt extractor 11 is fed to a receiver-side buffer (R-buffer) 12. The Vt extractor 11 also produces as the second output 32 (FIG. 4 at (e)) the present time information Vt of transmission side which has been extracted or detected from the coded data that has been transmitted through the transmission path. This time information 32 is fed to a discriminator 17S.

The receiver-side buffer 12 is, for example, a First-in First-out buffer and stores the Vid-added coded data 25 at a constant rate and reads out Vid-added coded data 26 (FIG. 4 at (f)) of an indefinite length at a field period (field unit). This read data is supplied to a time information Vid extractor or detector 13.

The Vid extractor 13 extracts or detects the time information Vid from the Vid-added coded data 26. Thus the extractor 13 produces the resulting Vid-extracted coded data 27 as the first output. This output 27 is supplied through a lead/lag (advance/delay) controller 17C to a decoder 14. The extractor 13 also produces as the second output 33 (FIG. 4 at (g)) the time information Vid which indicates the time at which the coded data is produced and which has been extracted from the coded data 26. This time information 33 is fed to the discriminator 17S. The Vt, Vid extractors may be constructed to extract Vt, Vid from the coded data and remove it therefrom, respectively.

The discriminator 17S compares the two pieces Vt, Vid of time information which are fed as input data 32, 33 and supplies a resulting lead/lag (advance/delay) control signal 34 to the lead/lag controller 17C.

The lead/lag controller 17C is responsive to the lead/lag control signal 34 to correct the phase of the coded data from the receiver-side buffer 12, and supplies corrected data 28 to the decoder 14.

The decoder 14 decodes the corrected coded data 28 which is fed from the lead/lag controller 17C, and produces the decoded image signal at an image signal output terminal 15.

The construction and operation of each portion such as the time information adding portion 40, time information extracting portion 41 and delay detection adjusting portion 42 concerned with this embodiment will be further described in detail.

A controller 18T has a delay circuit 18TA and a phase-locked-loop (PLL) oscillator 18TB. The delay circuit 18TA receives the image signal 50 from the input terminal 1 and responds to the leading edge of the signal at each field, for example, the vertical synchronizing pulse to supply, for example, one byte after, a start pulse 52 (FIG. 4 at (i)) to the Vid adder 3. In addition, the delay circuit 18TA supplies to the Vt adder 6 a start pulse 53 which is delayed relative to the start pulse 52 by an amount of phase corresponding to the time for which the data stays in the transmitter-side buffer 4. The PLL oscillator 18TB generates a timing pulse 51 (FIG. 4 at (j)) in synchronism with the leading edge of, for example, the vertical synchronizing pulse of the input image signal, and supplies it to the coder 2, transmitter-side buffer 4 and T-transmitter 7, thus controlling them in synchronism with the timing pulse. The timing pulses applied to the coder 2, transmitter-side buffer 4 and transmitter 7 may have different frequencies and phases, respectively.

The coder 2 codes the input image signal 50 in synchronism with the timing pulse 51, adds the control code indicative of a partition of data to it and supplies the resulting coded data 20 of a field unit to the Vid adder 3. In other words, the coded data 20 of each field includes the control code, for example, a start code STC (for example, one byte) indicative of each partition of the coded data and the corresponding one (for example, data a) of coded data a, b, c, d, e, f, ... as shown in FIG. 4 at (b).

The coded data production time information Vid 30 added to the coded data 20 is necessary to be able to discriminate about several times as large as a delay time T of data in the transmitter-side buffer 4, for example, to discriminate the successive 256 fields. Thus the timer 29 may be, for example, a 16-bit counter for counting the vertical synchronizing signal of the image signal, or the field number. In this case, for example the 8 less-significant (low-order) bits of the 16-bit output from the 16-bit counter may be fed to the Vid adder 3, Vt adder 6 as the time information 30, 31 (Vid, Vt). Therefore, the time information 30, 31 indicates the field number (No. or −value) of the image signal as shown in FIG. 4 at (a), that is a time lapse from a reference time point (in this case the field No. 1). Here, the value of the time information Vid is expressed by Z. Thus the value Z of the Vid added to, for example, the coded data a is one as illustrated.

The Vid adder 3 is responsive to the start pulse 52 to add the time information (count) from the timer 29 as the information Vid for indicating the time of the coded data production to, for example, the STC of the coded data 20 of each filed as shown in FIG. 4 at (b). The coded data 21 of each field after the addition of time information Vid includes the STC (for example, one byte), time information Vid (for example, one byte) and corresponding data (for example, data a of ten thousand bytes) of data a, b, c, d, e, f ...

Figure 5:
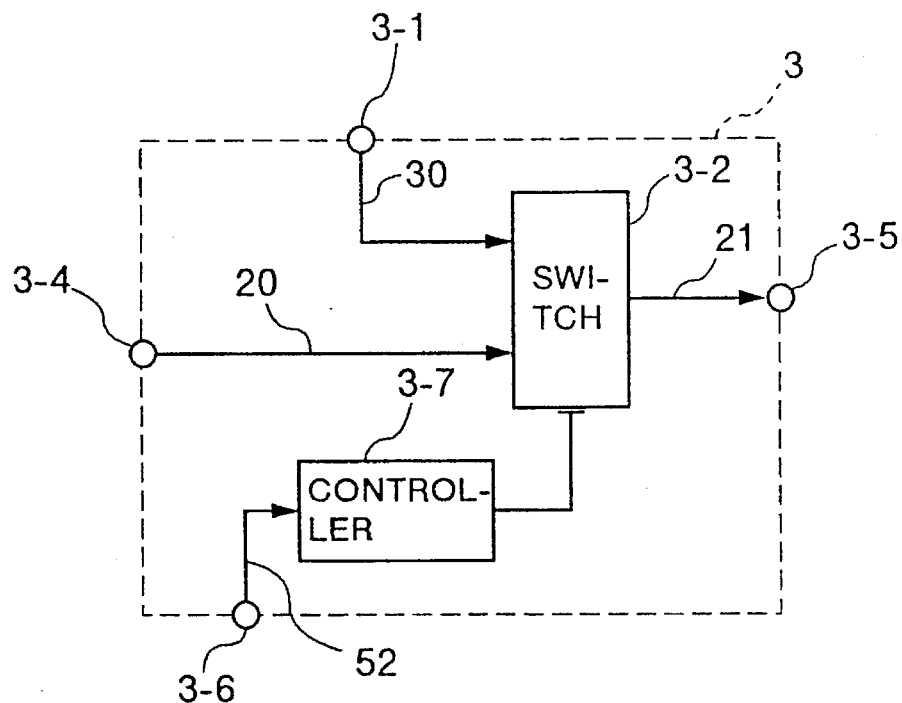
FIG. 5 is a block diagram of the arrangement of the Vid adder of the coding and transmitting system of FIG. 3.

FIG. 5 shows the arrangement of one example of the Vid adder 3. The Vid adder 3 has a controller 307 and a switch 3-2. The time information 30 is supplied through a terminal 3-1 to one input end of the switch 3-2, and the coded data 20 is fed through a terminal 3-4 to the other input end of the switch 3-2. The start pulse 52 is supplied through a terminal 3-6 to the controller 3-7. The Vid-added coded data 21 from the output of the switch 3-2 is fed through an output terminal 3-5 to the transmitter-side buffer 4.

The controller 3-7 is responsive to the start pulse 52 to produce a switching signal which is a high level only during, for example, one clock period (corresponding to one byte) and supply it to the control terminal of the switch 3-2. The switch 3-2 selects, for example, the time information Vid and produces it at the output terminal 3-5 during the high level of the switching signal. When the switching signal is a low level, the switch 3-2 selects, for example, coded data 20 and produces it at the output terminal 3-5. Therefore, since the start pulse 52 is generated immediately after the STC of the coded data 20, the Vid-added coded data 21 from the output terminal 3-5 includes Vid information (one byte) indicative of the coded data production time after the STC as shown in FIG. 4 at (b). Thus the information Vid is added to the coded data 20 of each field.

The transmitter-side buffer 4 is, for example, a first-in first-out buffer, receives the Vid-added coded data 21 in turn and produces the coded data 22 in the order of the constant-rate reception. When producing the coded data 22, the buffer 4 adds a timing signal synchronized with, for example, the STC of the coded data 21, or a signal SYNC (synchronizing code) to the head of each field period of the coded data. The STC and Vid information within the coded data 21 are included in coded data (for example, data a).

The transmitter-side buffer 4 reads out the written data after a time T in average, for example, three fields (3 V).

Thus the output from the buffer 4, or the Vid-added coded data 22 is delayed by the time T in average. The reason why the average delay time T is provided is that since the amount of coded data processed in the coder 2 is not constant over the fields, the time taken for the data to pass through the buffer 4 is dependent on the amount of data 20 fed from the coder 2 and thus must be made substantially constant by averaging.

The Vt adder 6 is responsive to the start pulse 53 to add, as shown in FIG. 4 at (c), to the code SYNC of the coded data 22 of each field the time information (count) (Z+T in this embodiment) which is fed from the timer 29 as the present time information Vt of the transmitter section. Therefore, the coded data 23 after the addition of time information Vid includes the SYNC (for example, one byte) and time information Vt (for example, one byte) at each field period. Thus, as for example shown in FIG. 4, the coded data a includes SYNC and Vt information at each of two regions across the boundary between the fields No.4 and No.5.

The construction of the Vt adder 6 is the same as the Vid adder 3 shown in FIG. 5, but the controller receives the start pulse 53. Thus the construction and operation of the Vt adder 6 will not be described in detail.

The coded data added with these time information and transmitted through the transmission path 16 to the receiver section is fed to the R-transmitter 10 by which it is converted back to the parallel data. The parallel data is fed as the time information (Vid, Vt)-added coded data 24 to the Vt extractor 11. Also, a pulse 55 synchronized with the SYNC is supplied to a controller 18R.

The controller 18R has a delay circuit 18RA, a PLL oscillator 18RB and a V, VH pulse generator 18RC. The delay circuit 18RA is responsive to the leading edge of the pulse 55 from the R-transmitter 10 to supply, for example, one byte after, a start pulse 57 (FIG. 4 at (i)) to the Vt extractor 11 and receiver-side buffer 12. In addition, the delay circuit supplies a start pulse 58 allowing for the delay in the receiver-side buffer 12 to the Vid extractor 13. The P11 oscillator 18RB generates a timing pulse 56 (FIG. 4 at (j)) in synchronism with, for example, the leading edge of the pulse 55 and supplies it to the R-transmitter 10, receiver-side buffer 12, lead/lag controller 17C and decoder 14, thus controlling them in synchronism with the timing pulse 56.

The timing pulses fed to the R-transmitter 10, receiver-side buffer 12, lead/lag controller 17C and decoder 14 may have different frequencies and phases for them.

In the timing chart of FIG. 4, the delay in the portion including the transmitter path 16 other than the transmitter-side buffer and receiver-side buffer is assumed to be negligibly small. Thus in FIG. 4 the start pulses 52, 57 and timing pulses 51, 56 are shown to have the same timing for convenience of explanation.

The V, VH pulse generator 18RC generates a V-pulse 59 in synchronism with the leading edge of the pulse 55 and supplies it to the discriminator 17S. It also generates a VH1-pulse 60 with, for example, one-byte width in synchronism with the leading edge of the pulse 55 (or synchronism with the leading edge of SYNC, STC) and a VH2-pulse 61 with one-byte width delayed two bytes or more (here, 2 bytes) from the pulse 60 and supplies them to the lead/lag controller 17C (see FIG. 10B).

The Vt extractor 11 is responsive to the start pulse 57 to extract time information Vt from the coded data 24 which is fed from the R-transmitter 10 as shown in FIG. 4 at (e).

Figure 6:
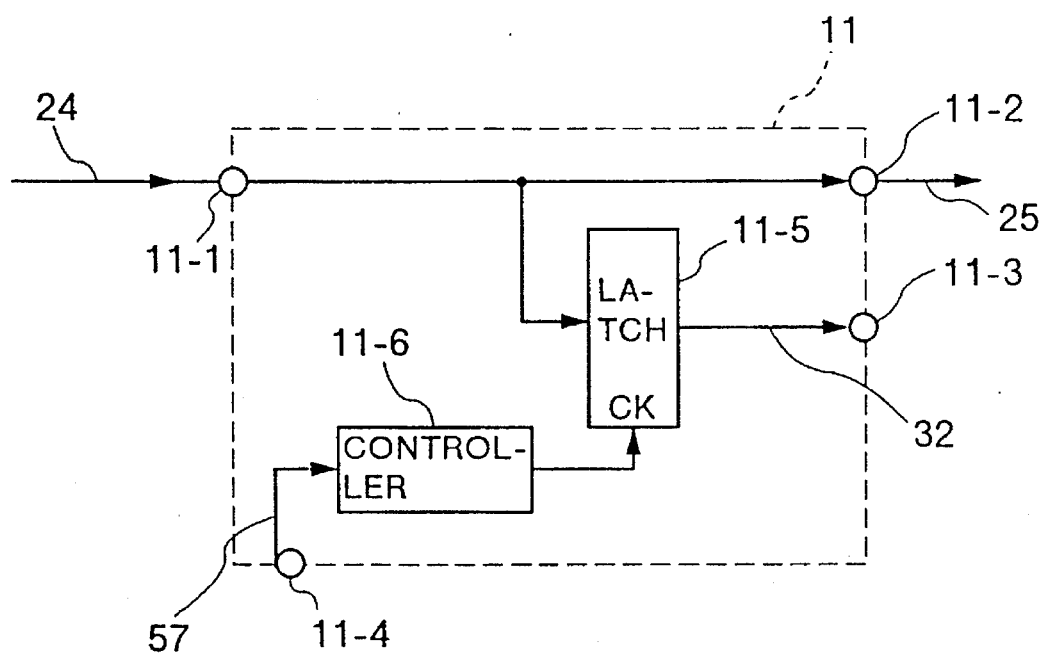
FIG. 6 is a block diagram of the arrangement of the Vt extractor of the coding and transmitting system of FIG. 3.

FIG. 6 shows the arrangement of one example of the Vt extractor 11. The Vt extractor 11 has a controller 11-6 and a latch 11-5. The coded data 24 (FIG. 4 at (d)) with time information Vt, Vid at a constant rate is supplied through a terminal 11-1 to the data input terminal of the latch 11-5 and to an output terminal 11-2. The data appearing at the output terminal 11-2 is fed to the receiver-side buffer 12 as constant-rate coded data 25 with information Vt, Vid. The output from the latch 11-5 is fed through an output terminal 11-3 to the discriminator 17S. The start pulse 57 is supplied through an input terminal 11-4 to the controller 11-6.

The controller 11-6 is responsive to the start pulse 57 to generate a latch signal which is a high level only during, for example, one clock period (corresponding to one byte) and supply it to the clock terminal of the latch 11-5. The latch 11-5 holds the coded data fed to the data input terminal only during the time in which the latch signal is a high level. In other words, the latch 11-5 holds the time information Vid and supplies it as time information Vt32 (FIG. 4 at (e)) to the discriminator 17S through the output terminal 11-3.

The receiver-side buffer 12 successively receives the constant-rate Vt, Vid-added coded data 25 and produces the coded data 26 of each field in the order of the constant-rate reception. In this case, the receiver-side buffer 12 responds to the timing pulse 57 not to hold the SYNC, Vt of the coded data 25 but to hold the other coded data. When producing the coded data 26, as shown in FIG. 4 at (f) the receiver-side buffer 12 generates the STC of the coded data 25 to be synchronized with the SYNC of the coded data, or at the head of each field period. Similarly, it generates the time information Vid of the coded data 25 after the STC and then the coded data (for example, data a). That is, it produces data of an indefinite length.

When the decoder 14 detects the STC within the input data, it supplies a read request signal 35 to the receiver-side buffer 12. The receiver-side buffer 12 responds to the request signal to produce the coded data (for example, data a) following the STC.

A time X, for example, three fields (3 V) in average after the writing operation the receiver-side buffer 12 reads out the written data. Thus the output from the buffer 12, or the Vid-added coded data 26 is delayed by the time X in average relative to the input data 25. The reason why the average delay time X is provided is the same as that in the transmitter-side buffer.

The coded data 26 from the receiver-side buffer 12 is fed to the Vid extractor 13. The Vid extractor 13 responds to the start pulse 58 to extract the time information Vid (of value Z) from the coded data 26 and supply it to the discriminator 17S as the time information Vid 33 (FIG. 4 at (g)). The construction of the Vid extractor 13 is the same as the Vt extractor 11 shown in FIG. 6, but the start pulse 58 is supplied to the controller 11-6. Thus its construction and operation will not be described in detail. In this way, the same data as the coded data 26 shown in FIG. 4 at (f) is supplied to the lead/lag controller 17C.

Since the time information Vid is added at the beginning of the coded data 26 in the transmitter section, the time information Vid can be easily extracted from the beginning end of the coded data in the receiver section.

The discriminator 17S compares the present time information Vt 32 (the time at the discriminator 17S, the value of Z+T+X in this embodiment) of the transmitter section from the Vt extractor 11 and the time information 33 (the value Z in this embodiment) at which the image signal is coded and which is fed from the extractor 13 to check if the total delay time in the transmitter and receiver sections Vt–Vid (in this case, substantially equal to the total delay time in the buffer 4 and extractor 11) equals a set value (or in this embodiment, it checks if the time information difference (Vt–Vid) equals the value of T+X).

As a result, the discriminator 17S supplies to the lead/lag controller 17C the control signal 34 which indicates that the coded data from the receiver-side buffer 12 leads or lags (or advanced or delayed from the reference or normal phase) in phase (, or that the delay time is smaller or larger than the certain value (T+X)). The lead/lag controller 17C responds to the control signal 34 to operate the control code of the coded data produced from the receiver-side buffer 12, thereby correcting the phase-lead or lag of the coded data so that the total delay time in the transmitter section and receiver section can be restored to the predetermined value.

Figure 7:
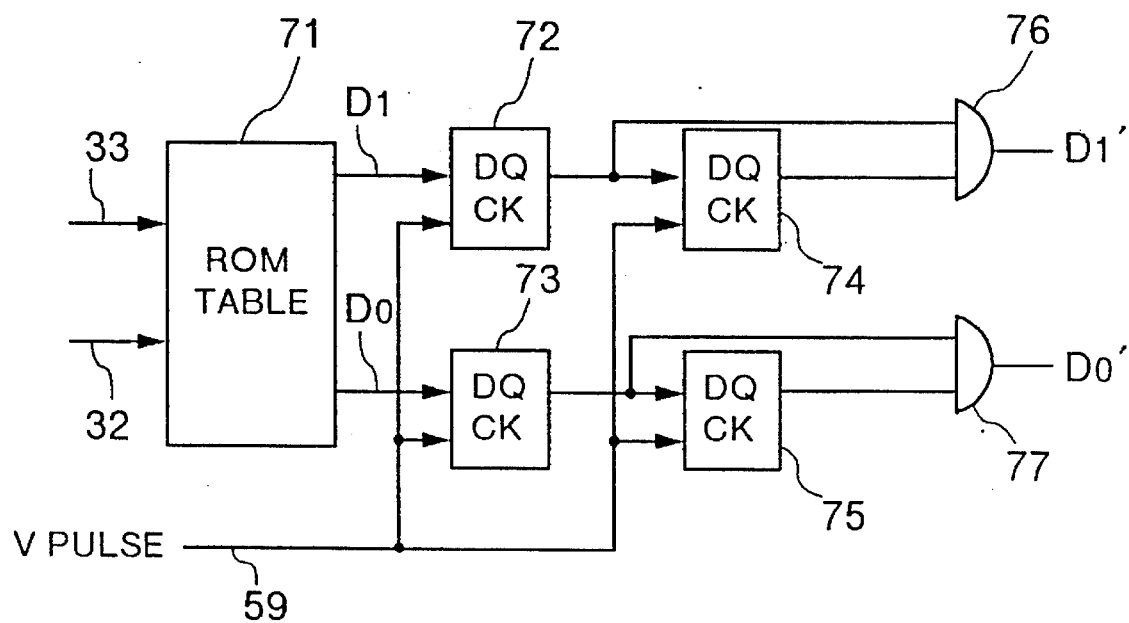
FIG. 7 is a circuit diagram of the arrangement of the discriminator of the coding and transmitting system of FIG. 3.

FIG. 7 shows the arrangement of one example of the discriminator 17S. FIG. 8 shows one example of the ROM table of the discriminator of FIG. 7. The discriminator 17S, as shown in FIG. 7, has a ROM table 71 which is used to compare the time information Vt, Vid 32, 33 at each field and produce the compared result, or data D1, D0 indicating the phase lead or lag of the coded data, D-type flip-flops 72 through 75 and AND gates 76, 77. The V-pulse 59 is supplied to the clock input end CK of each D-type flip-flop.

As in the above description of the prior art, if there is no error during the transmission of coded data, the difference (Vt–Vid) between the time information Vt, Vid is equal to the above predetermined value (T+X) (here, six fields (6 V)), but if an error occurs during the transmission so that the receiver-side buffer 12 inappropriately partitions the coded data, the phase of the coded data read from the receiver-side buffer 12 will lead or lag. In other words, if the receiver-side buffer mistakes the STC for other codes or mistakes other codes for the STC, the phase of the coded data read from the receiver-side buffer 12 will lead or lag and the difference (Vt–Vid) will be less than 5 V or larger than 7 V. Therefore, the ROM table is constructed as described below so as to produce the data D1, D0 which indicate the phase lead or lag of the coded data.

In the ROM table 71 as shown in FIGS. 8A and 8B, the present time information Vt (for example, 8 bits) is assigned to the less-significant (low-order) address and the production time information Vid (for example, 8 bits) to the more-significant (high-order) address. In FIGS. 8A and 8B, the number in parentheses ( ) indicates a decimal address value, the S-line, ~ indicates the same value and the dotted line — — — indicates orderly increase of values. The values of D1 bit and D0 bit of ROM data corresponding to Vid, Vt value of each set in this embodiment are fixed as follows. If the difference (Vt–Vid) is larger than the predetermined value (T+X) (6 V) (the phase of the coded data lags), (D1, D0) is (1, 0). If it is equal to (T+X) (the phase is normal), (D1, D0) is (0, 0). If it is smaller than (T+X) (the phase leads), (D1, D0) is (0, 1). In other words, when Vid is "0000 0000" (0 in decimal notation) at the top of the left column in FIG. 8, (D1, D0) is (0, 1) for Vt of "0000 0000" "0000 0101" (0–5 in decimal notation). In this case, when Vt is "0000 0110" (6 in decimal notation), (D1, D0) is (0, 0), and when Vt is "0000 0111"–"1111 1111" (7–255 in decimal notation), (D1, D0) is (1, 0).

Therefore, the ROM table 71 is addressed on the basis of the time information Vt, Vid 32, 33 to produce data (D1, D0) indicating lead, lag and normal of the coded data from the receiver-side buffer 12.

In this embodiment, in order to prevent the erroneous recognition of phase lead and lag and to stably produce the image signal, decision is made as follows. When the lead or lag of the coded data is detected a plurality of consecutive times (here, twice or more) in the comparison between the time information Vt, Vid of coded data at each field, the phase of the coded data is decided to lead or lag and data D1', D0' indicating this decision is produced. In other words, if the phase shifting control is made on the basis of a single-time decision result, the phase of the coded data may be unstable.

The construction for this purpose includes the D-type flip-flops 72 through 75 and AND gates 74, 75 in FIG. 7. Thus the output (D1', D0') of the AND gate 76, 77 is (0, 1) when the phase of the coded data of each field is decided to lead consecutively twice or more, (1, 0) when it is decided to lag consecutively twice or more and (0, 0) when it is decided to be other than lead and lag, or to be normal.

Figure 9:
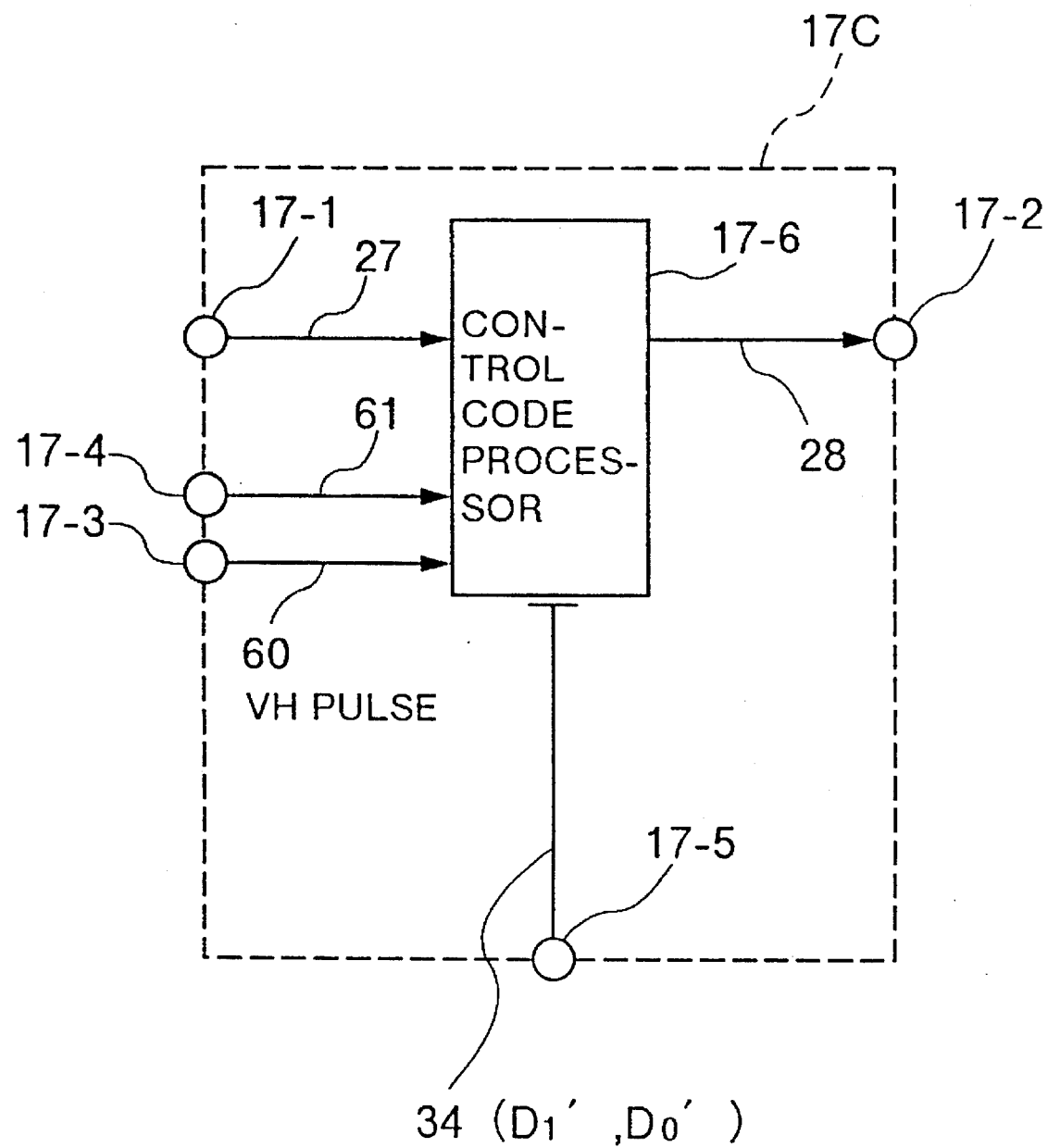
FIG. 9 is a block diagram of the arrangement of the lead/lag controller of the coding and transmitting system of FIG. 3.

The data D1', D0' from the discriminator 17S is supplied to the lead/lag controller 17C as the control signal 34. FIG. 9 shows the construction of one example of the lead/lag controller 17C. The lead/lag controller 17C has, for example, a control code processor 17-6. The VH-added coded data of an indefinite length from the receiver-side buffer 12 is supplied through an input terminal 17-1 to the control code processor 17-6. The output from the control code processor 17-6 is supplied through a terminal 17-2 to the decoder 14. The lead/lag control signal 34 from the discriminator 17S is supplied through an input terminal 17-5 to the control terminal of the control code processor 17-6.

In addition, the VH1 pulse 60 and VH2 pulse 61 are supplied through input terminals 17-3, 17-4 to the control code processor 17-6.

If the data (D1', D0') of lead/lag control signal 34 fed to the control terminal is (0, 1) indicating lead, the control code processor 17-3, during the high level ("1") period of VH2 pulse (corresponding to the data of one byte following the Vid in the normal coded data, replaces the code of that period by STC, but during the low level of VH2 pulse and during the low level and high level of VH1 pulse, produces the input coded data as it is (see FIG. 10B). If the data (D1', D0') is (1, 0) indicating lag, the control code processor, during the high level ("1") period of VH1 pulse (corresponding to the STC of the normal coded data), replaces the code of that period by STC, but during the low level of VH1 pulse and during the low level and high level of VH2 pulse, produces the input coded data as it is. If the data (D1', D0') is (0, 0) indicating the normal state without lead and lag, input coded data is always produced as it is.

The control code processor 17-6 is specifically made up of the ROM table shown in FIG. 10A. The ROM table is addressed by the control signal 34, VH1 pulse 60 and VH2 pulse 61, and the input coded data is replaced in accordance with the modes of these signal and pulses.

In FIG. 10A, the high level and low level of VH1, VH2 pulse are indicated by "0", "1", and the "normal" indicates that the input coded data is produced as it is without replacement.

When the decoder 14 decodes the phase-corrected coded data 28 from the lead/lag controller 17C into the image signal, it is responsive to the STC of the input coded data to supply the read request signal 35 to the receiver-side buffer 12 so that the coded data (for example, data a) corresponding to the STC can be read from the receiver-side buffer.

Figure 12:
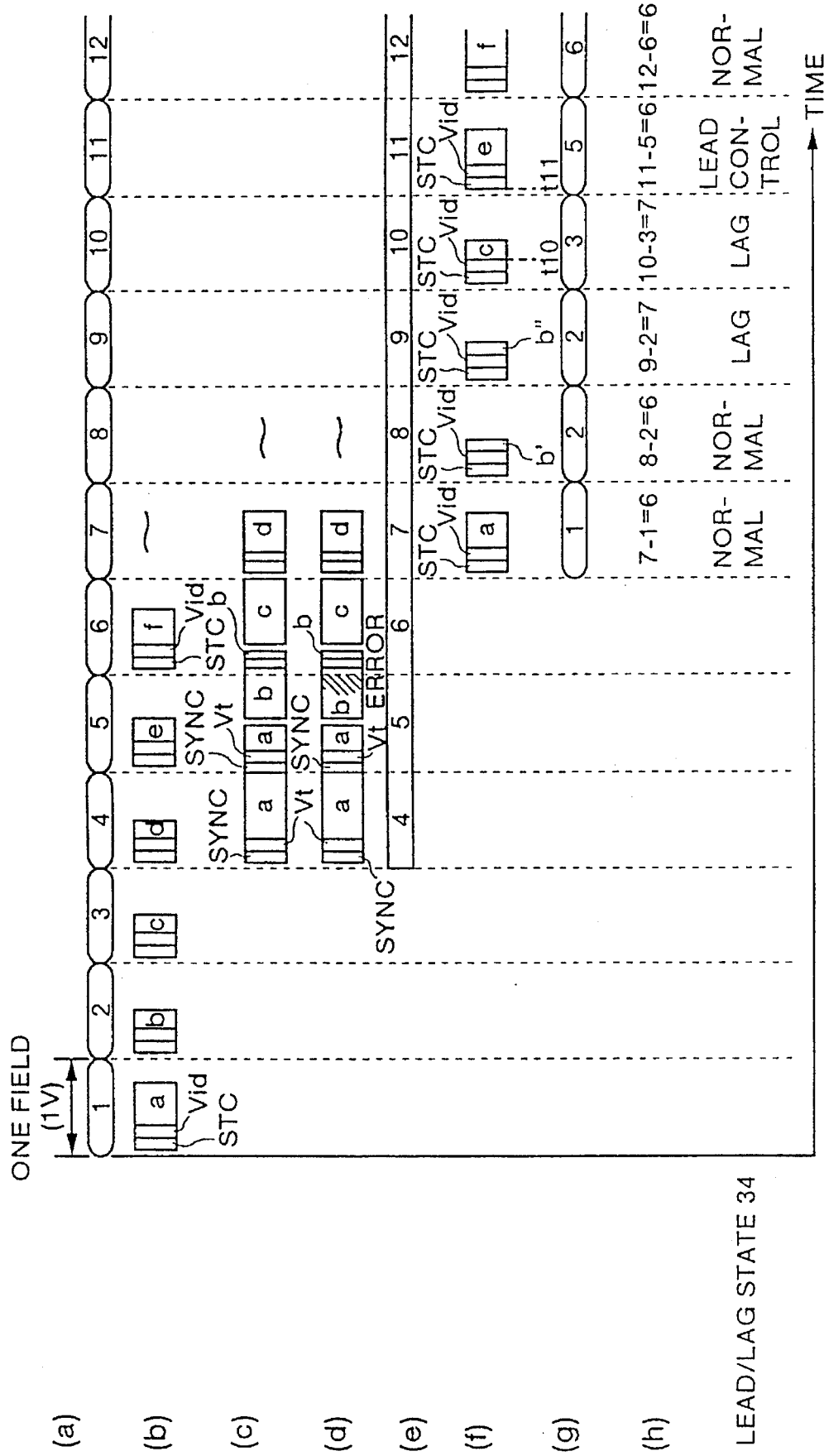
FIG. 12 is a timing chart of data at each part to which reference is made in explaining the operation of the coding and transmitting system of FIG. 3 at the time of data lag.

The operation at the normal state (upon no time advance or delay) and the operation at the abnormal state (upon time advance or delay) will be described in detail with reference to the timing charts of FIGS. 4, 11 and 12.

The timing charts of FIGS. 4 and 11 show data at each portion to which reference is made in explaining the operation of the coding and transmitting system of FIG. 3 at the normal time and data-lead time.

It is assumed that the average time T, X in which the coded data is passed through the transmitter-side buffer 4, receiver-side buffer 12 is 3 V (3 fields).

The Vid adder 3 adds the coded data production time information Vid 30 to the coded data 20 of an indefinite length from the coder 2 and produces the Vid-added coded data 21 shown in FIG. 4 at (b). The Vid-added coded data 21 is supplied to the transmitter-side buffer 4, thereby delayed by a time of about 3 V to produce the coded data 22 from the buffer.

The Vt adder 6 adds to the coded data 22 the current eight less-significant bits of the output from the counter (timer 29) for counting the field number as the present time information Vt 31. In other words, it adds the transmitter-side present time information to the coded data 22 to produce the coded data 23 shown in FIG. 4 at (c). Then, the Vt, Vid-added coded data 23 is supplied through the T-transmitter 7 to the receiver section.

At this time, if the system is in the normal state, the difference (Vt–Vid) between the time information Vt, Vid included in the coded data 22 of each field is equal to the average time T=3 V in which the coded data is passed through the transmitter-side buffer 4.

The R-transmitter 10 in the receiver section recovers from the transmitted data the Vt, Vid-added coded data 24 shown in FIG. 4 at (d) which is equivalent to the Vt; Vid-added coded data 23. The Vt extractor 11 extracts the present time information Vt 31 which was added to the coded data in the transmitter section and produces it as the present time information Vt, 32 shown in FIG. 4 at (e).

Then, the coded data 25 which has the production time information Vid 30 left after the extraction of the present time information Vt 31 is stored in the receiver-side buffer 12.

The decoder 14 causes the receiver-side buffer 12 to produce the Vid-added coded data 26 of an indefinite length necessary for decoding each field. At this time, the Vid-added coded data 26 is supplied to the Vid extractor 13, where the production information Vid 30 which was added by the Vid adder 3 of the transmitter section is extracted as the production time information Vid 33 shown in FIG. 4 at (g).

At this time, if the system is in the normal state, the difference (Vt–Vid) between the time information Vt included in the coded data 24 at the input side of the receiver-side buffer 12 and the time information Vid included in the coded data 26 at the output side thereof is equal to the average time X=3 V in which the coded data is passed through the receiver-side buffer 12.

The discriminator 17S examines if the time difference between the present time information Vt 32 and the production time information Vid 33 is twice as large as the predetermined time, 3 V (the average time in which the coded data is passed through each of the transmitter-side buffer and the receiver-side buffer), or T+X=6 V. If there is no error during the transmission of data through the path 16 as shown in FIG. 4 at (h), the difference is always 2×3 V. If there is an error during the transmission as shown in FIG. 11 at (d), the coded data is erroneously partitioned so that the coded data produced from the receiver-side buffer 12 is not the coded data that was produced at the time of interest as shown in FIG. 11 at (f).

In other words, if error data or the like is mixed into the coded data during the transmission to disturb the STC included therein, the receiver-side buffer 12 cannot detect the STC. For example, in FIG. 11, if error data or the like is mixed into the portion shaded in FIG. 11 at (d) during the transmission to disturb, for example, the STC within the coded data, the receiver-side buffer 12 cannot detect the STC within the coded data. Thus as shown in FIG. 11 at (f), the coded data b which originally should be read in the No.8 field is read together with the coded data a in the No.7 field. Consequently, if this situation is left as it is, the coded data c, d, e, f are read out in the following fields No.8, 9, 10, 11, with the result that data one field out of phase (lag) is read out.

In that case, the production time information Vid 33 is also deviated from the correct value. That is, as shown in FIG. 11 at (g), the value Vid 33 in the No.8, 9 field is shifted from the correct value, 2.3 to an incorrect value 3.4. Thus in No.7 field, the difference Vt–Vid is the correct value 6 V, but in No.8, 9 field, the difference Vt–Vid is continuously 5 V which indicates that the phase of the coded data leads.

If the phase of the coded data leads twice successively, the discriminator 17S generates the control signal 34 which indicates that the coded data has a phase lead in No.9 field at time t9. As a result, the lead/lag controller 17C responds to the control signal 34 to replace the data at the following VH2 pulse, or at the third byte (time point t10) of the same No.9 field by STC, thus supplying its output to the decoder 14.

Then, the decoder 14 responds to the STC provided at time t10 to supply the read request signal 35 to the receiver-side buffer 12 at the beginning of the following field No.10, causing it to read out the coded data d.

Therefore, correct coded data are read in the field No.11 and the following fields.

While in this embodiment the VH2 pulse is made a high level at the third byte of each field, it may be made a high level at the fourth byte or at the following byte so that the coded data d can be read out separately over the fields Nos.9 and 10.

The operation in the case when the coded data lags will be described with reference to FIG. 12.

If error data or the like is mixed into the coded data during the transmission to produce STC within it by mistake, the receiver-side buffer 12 detects the erroneous STC. For example, in FIG. 12, if error data or the like is mixed into the coded data b as shaded in FIG. 12 at (d), the receiver-side buffer 12 mistakes the error data or the like for STC. Thus as shown in FIG. 12 at (f) the coded data b to be originally read from the buffer 12 in the field No.8 is read out partly in the field No.8 and partly in the field No.9. In other words, only data b' of the coded data b is read in the field No.8, and the remaining data b" of the coded data b is read in the field No.9 (here b=b'+b"). Thus if this situation is left as it is, the coded data c, d, e are read in the following fields No.10, No.11, No.12, respectively, with the result that data one field out of phase (lag) is read out.

In that case, the value of the production time information Vid 33 is deviated from the correct value. In other words, as shown in FIG. 12 at (g), the value of Vid 33 in the field No.8, 9, 10 is respectively shifted from the correct value 2, 3, 4 to an incorrect value 2, 2, 3. Thus, the difference Vt–Vid in the field No.7, 8 is the correct value 6 V, but the difference Vt–Vid in the successive fields No.9, 10 is an incorrect value 7 V which indicates that the coded data lags.

If the coded data lags twice consecutively, the discriminator 17S produces at a time point t10 in the field No.10 the control signal 34 indicative of a phase lag of the coded data.

As a result, the lead/lag controller 17C responds to the control signal 34 to replace the STC of coded data d by other codes at the timing of the next VH1 pulse, or at the beginning (time point t11) of the field No. 11. Thus the coded data d is read out from the buffer 12, but not decoded in the decoder 14, and so the next coded data e is read out from the buffer. Therefore, in the field No.11, the coded data e is read and supplied to the decoder 14 and then decoded.

Consequently, in the field No.11 and the following fields, correct coded data are read out and decoded.

Thus, when the detected total delay time of the coded data is larger by a certain amount (here one field) than a predetermined delay time, the lead/lag controller 17C causes the phase of the coded data to lead by the amount of data unit (here, one field) partitioned by the control codes STC which indicate the partitions of the data. When it is smaller by the certain amount than the predetermined delay time, the lead/lag controller 17C causes the phase of the coded data to lag by the amount of data unit partitioned by the control codes STC.

Figure 13:
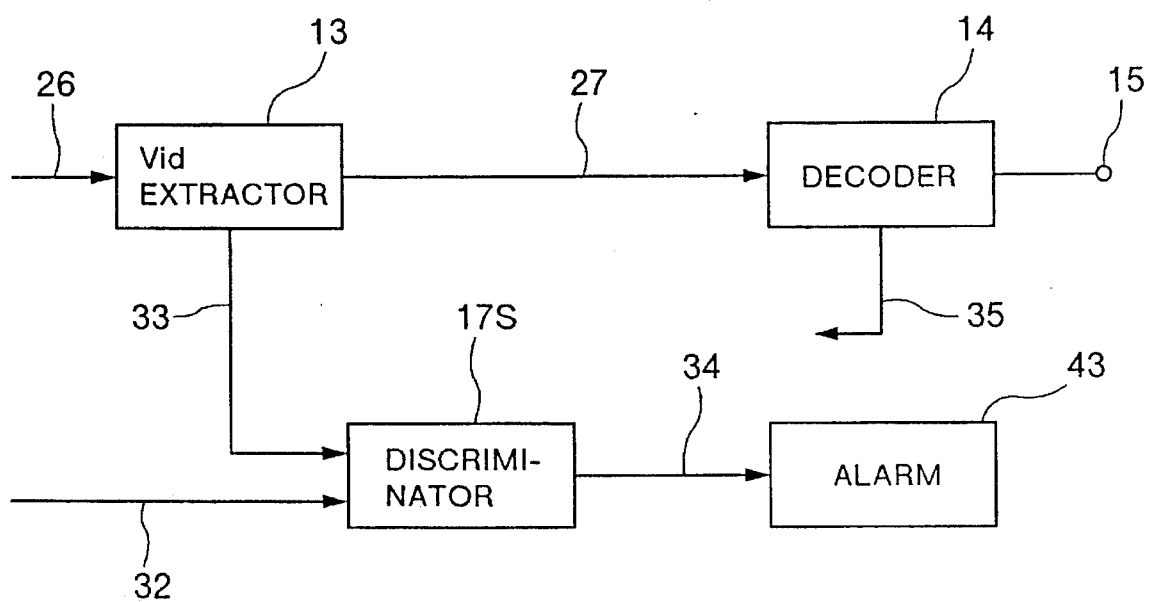
FIG. 13 is a block diagram of a main part of another embodiment of the coding and transmitting system of the invention.

Another embodiment of the coding and transmitting system of the invention will be described with reference to FIG. 13. FIG. 13 shows a main part of this embodiment. The other portions have the same construction as in the embodiment of FIG. 3. In other words, this embodiment has an alarm 43 provided in place of the lead/lag controller 17C. The control signal 34 from the discriminator 17S is fed not to the lead/lag controller 17C for correcting (phase-shifting) the coded data, but to the alarm 43 so that when an error (lead, lag) occurs in the coded data, it informs the operator of this error occurrence. The alarm 43 may be an alarm for emanating a warning sound or a light-emitting lamp when the control signal 34 indicates the abnormal state of the coded data. In that case, the warning sound tone or the color of the light emission may be changed in order for the operator to discriminate the kind of the abnormal state (lag or lead). The alarm may be a display such as CRT on which the kind of the abnormal state can be displayed. In addition, an alarm may added to the arrangement of FIG. 3.

Still another embodiment of the coding and transmitting system of the invention will be described with reference to FIG. 14.

Figure 14:
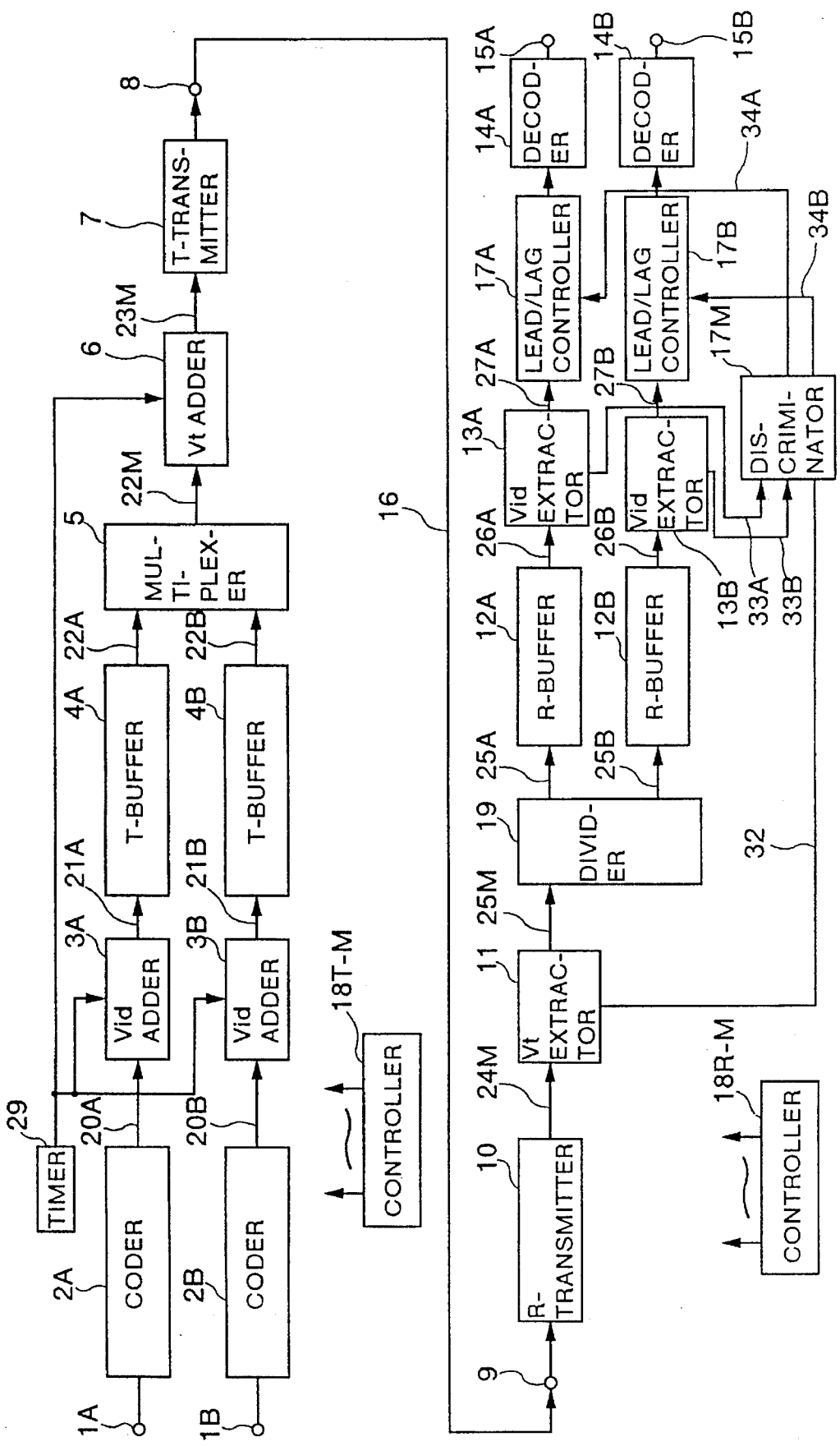
FIG. 14 is a block diagram of the arrangement of still another embodiment of the coding and transmitting system of the invention.

In FIG. 14, like elements corresponding to those in FIG. 3 are identified by the same reference numerals, and the elements attached with reference numerals and letters A, B are the same as those represented by like reference numerals but without the letters A, B in FIG. 3. Thus these elements will not be described.

FIG. 14 is a block diagram of the system for use in transmitting a plurality of coded data on a single transmission path. Referring to FIG. 14, two separate image signals are supplied through image signal input terminals 1A, 1B to coders 2A, 2B, respectively. The coders 2A, 2B code the image signals and supply coded data 20A, 20B to Vid adders 3A, 3B, respectively. The Vid adders 3A, 3B add coded data production time information Vid from the timer 29 to the coded data to produce Vid-added coded data 21A, 21B, which are then supplied to transmitter-side buffers 4A, 4B.

The transmitter-side buffers 4A, 4B temporarily store the Vid-added coded data 21A, 21B and read them as Vid-added data 22A, 22B, which are then supplied to a multiplexer 5. The multiplexer 5 multiplexes the Vid-added data 22A, 22B and supplies the resulting multiplex Vid-added coded data 22M to the Vt adder 6.

The Vt adder 6 adds the present time information Vt to the multiplex Vid-added coded data 22M to produce a Vt, Vid-added coded data 23M which is then supplied to the T-transmitter 7. The T-transmitter 7 converts the multiplex Vt, Vid-added coded data 23M into transmission data, which is then transmitted from the transmission data terminal 8 through the transmission path 16 to the receiver section.

In the receiver section, the transmission data is converted by the R-transmitter 10 into multiplex Vt, Vid-added coded data 24M, which is then supplied to the Vt extractor 11. The Vt extractor 11 extracts the present time information Vt from the input data, and it supplies the first output, or multiplex Vid-added coded data 25M without the present time information Vt to a divider 19 and the second output, or the extracted present time information Vt 32 to a discriminator 17M.

The divider 19 divides the multiplex Vid-added coded data 25M into Vid-added coded data 25A, 25B, which are then stored in receiver-side buffers 12A, 12B, respectively.

The receiver-side buffers 12A, 12B supply their outputs, or Vid-added data 26A, 26B to Vid extractors 13A, 13B, respectively. The Vid extractors 13A, 13B supply their first outputs, or coded data 27A, 27B with the time information Vid removed to decoders 14A, 14B through lead/lag controllers 17A, 17B, respectively.

In addition, the second outputs from the Vid extractors 13A, 13B, or the extracted Vid 33A, 33B are supplied to the discriminator 17M. The discriminator 17M supply their outputs, or lead/lag control signals 34A, 34B to the lead/lag controllers 17A, 17B, respectively.

Moreover, controllers 18T-M, 18R-M may be the same as the controllers 18T, 18M in FIG. 3, respectively. The controller 18T-M supplies the timing pulse 51, though not shown, to a pair of coders 20A, 20B and transmitter-side buffers 4A, 4B and also to the T-transmitter 7 and multiplexer 5. In addition, it supplies the start pulses 52, 53 to the Vid adders 3A, 3B and Vt adder 6.

Similarly, the controller 18R-M supplies the timing pulse 56 and so on similar to those in FIG. 3 to elements of the arrangement, though not shown.

The operation of a different part of this embodiment from the embodiment of FIG. 3 will be described in detail. The multiplexer 5 is responsive to the timing pulse 51 to switch the two separate Vid-added coded data 22A, 22B of a constant rate alternately at, for example, every bytes, thereby producing a single-channel multiplex Vid-added data 22M. In this case, it is necessary to read out the Vid-added coded data alternately at every bytes from the transmitter-side buffers 4A, 4B.

Contrary to the transmitter side, the divider 19 separates the single-channel multiplex Vid-added coded data 25M at every bytes into two alternate coded data 25A, 25B.

The two time information Vid 33A, 33B produced by the Vid extractors 13A, 13B are compared with the time information Vt 32 from the Vt extractor 11 in the discriminator 17M. In this case, since the time information Vid 33A, 33B normally have the same value, an abnormal state due to an error or the like mixed into the transmitted data can be detected from the difference between the time information Vid 33A, 33B.

Figure 1:
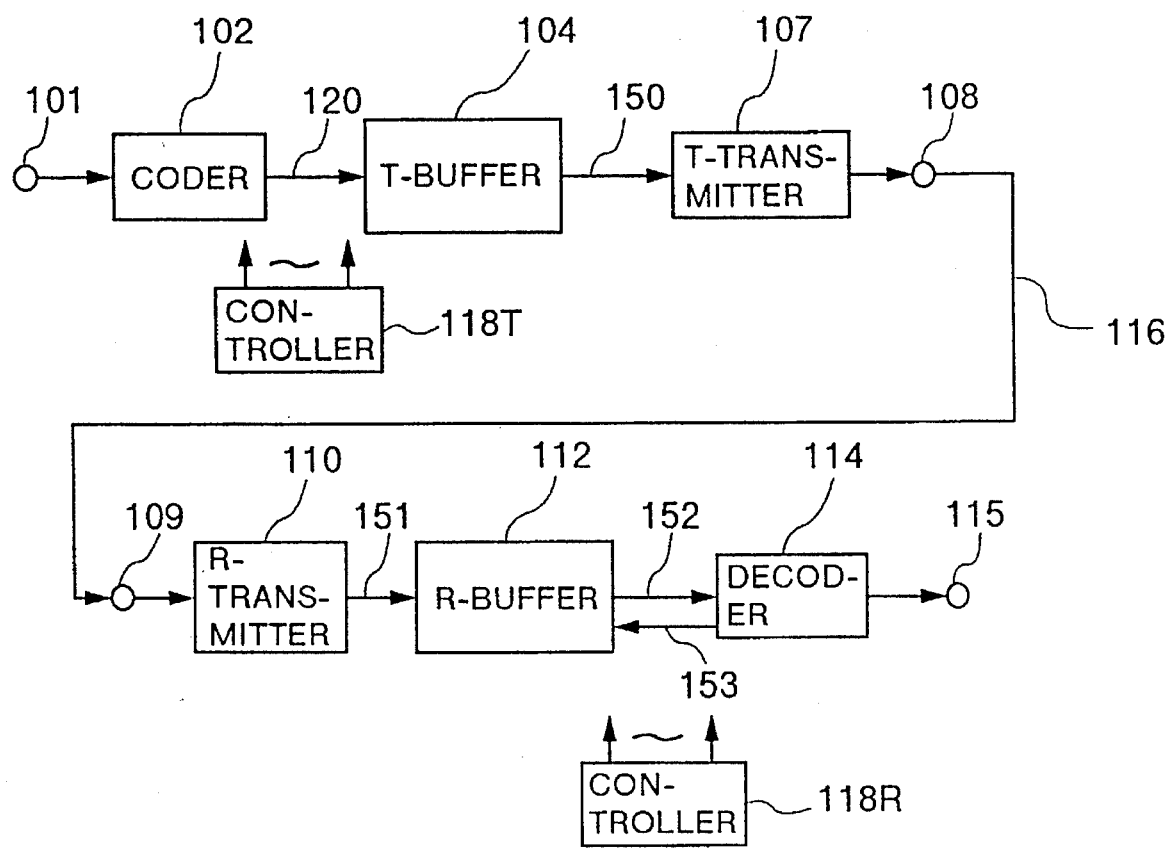
FIG. 1 is a block diagram of the arrangement of one example of the related art coding and transmitting system.
Figure 2:
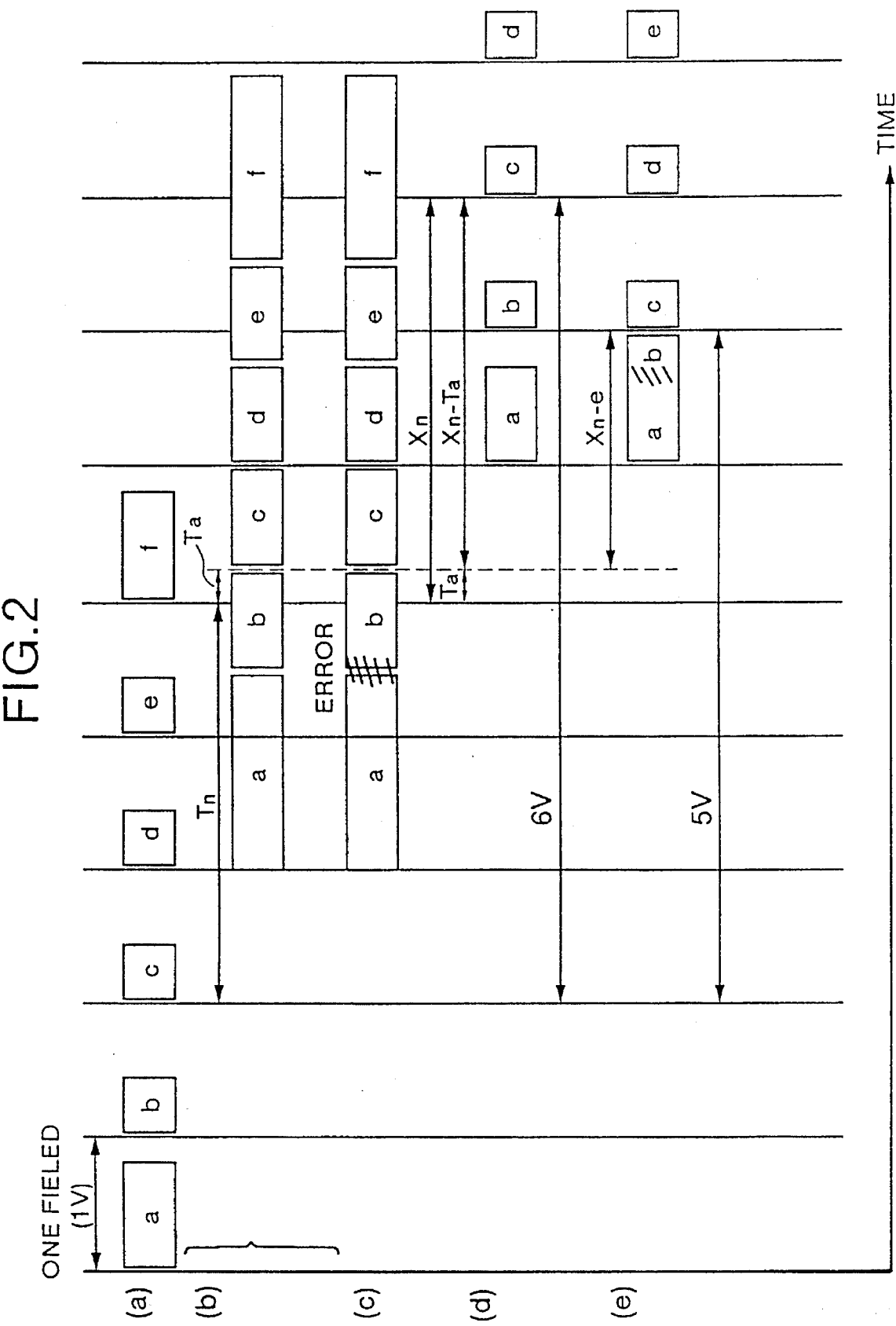
FIG. 2 is a timing chart of data at each part to which reference is made in explaining the operation of the coding and transmitting system of FIG. 1.

In order to realize the discriminator 17M for use in such multiplex data transmission, it is necessary to provide the discriminator 17S shown in FIG. 1 on each of two channels.

The embodiment shown in FIG. 13 can also be applied to this embodiment.

While in the above embodiments the lead/lag controller 17C is provided on the path of data, this controller may be removed and instead the control signal 34 may be supplied to the decoder 14. In this case, the length (for example, the high-level period) of the data request signal 35 is changed in accordance with lead or lag as shown in FIG. 11 at (i).

If in the embodiment of FIG. 14 only the abnormal state (lag, lead) of the coded data is desired to detect, the transmitter section does not send the time information Vt to the receiver section but transmit only the time information Vid to the receiver section, where the time information Vid on two channels A, B are compared with each other. In this case, the lead/lag controllers 17A, 17B are not provided but instead the alarm is provided as in the embodiment of FIG. 13.

If in the above embodiments a timer for absolute time information is provided in the transmitter and receiver section, those absolute time information may be used instead of the time information Vt.

In addition, while in the above embodiments lag or lead control is made when the lag or lead of the coded data is detected twice or more in succession, the lag or lead control may be performed when the lag or lead is detected once.

Thus, according to this invention, even if part of the signal in the coding and transmitting system is caused to change or drop out by an error mixed in the system during the transmission, the time information added to the coded data is detected and used to correct the phase of the decoded output signal or warn the operator of the abnormal output phase, and therefore such an abnormal state of the phase of the coded data can be swiftly removed from the system.

What is claimed is:

1. A coding and transmitting system comprising a transmitted section and a receiver section connected with said transmitter section through a transmission path, wherein said transmitter section includes:

means for coding an image signal into coded data, means for adding first time information, indicating a time at which said coded data from said coding means is produced, to said coded data, said adding means being coupled to said coding means, means for transmitting said coded data to said transmission path, and means for adding a second time information, indicating a time at which said coded data is transmitted to said transmission path, to said coded data; and wherein said receiver section includes:

means for detecting said first and second time information included in said coded data transmitted from said transmission path, means for detecting whether or not a total delay time of said coded data between said transmitter and receiver sections is within a predetermined delay time based on said detected first and second time information, means for controlling a phase of said coded data transmitted on said transmission path in response to a result of the detection by said detecting means of said total delay time, and means or decoding said coded data from said controlling means to an original image data.

2. A coding and transmitting system according to claim 1, wherein said phase control means comprises:

means for causing the phase of said coded data to lead when said detected total delay time of said coded data is larger than said predetermined delay time and to lag when said total delay time is smaller than said predetermined delay time.

3. A coding and transmitting system comprising a transmitter section for sending coded data to a transmission path and a receiver section for receiving said coded data transmitted through said transmission path, wherein said transmitter section comprises:

a coder for converting an image signal into said coded data, timer means for producing time information which indicates a time lapse from a reference time, first time data adding means, coupled to said coder, for adding first time information from said timer means indicating a time at which said coded data from said coder is produced to said coded data from said coder, a transmitter-side buffer for writing and reading said coded data with said first time information, and second time data adding means, coupled to said transmission-side buffer, for adding second time information from said timer means indicating a time at which said coded data is transmitted to said transmission path to said coded data read from said transmission-side buffer; and said receiver section comprises:

means for detecting said second time information from said coded data which is transmitted through said transmission path, a receiver-side buffer for writing and reading said coded data transmitted through said transmission path, means for detecting said first time information from said coded data read from said receiver-side buffer, means for detecting whether or not a total delay time of said coded data between said transmitter and receiver sections is within a predetermined delay time based on said detected first and second time information, means for controlling the phase of said coded data read from said receiver-side buffer in response to a result of the detection by said detecting means of said total delay time, and means for decoding said coded data from said controlling means to an original image data.

4. A coding and transmitting system according to claim 1, wherein said phase control means has means for causing the phase of said coded data to lead when said detected total delay time of said coded data is larger than said predetermined delay time and to lag when said total delay time is smaller than said predetermined delay time.

5. A coding and transmitting system according to claim 4, wherein said predetermined delay time is substantially equal to the sum of the delay time of said transmitter-side buffer and that of said receiver-side buffer.

6. A coding and transmitting system comprising a transmitting section for sending coded data to a transmission path and a receiver section for receiving said coded data transmitted through said transmission path, wherein said transmitter section comprises:

a coder for coding an image signal into said coded data of a variable length which includes a control code indicative of each partition of data, timer means for producing time information indicative of a time lapse from a reference time, first time data adding means coupled to said coder, for adding first time information from said timer means indicating a time at which said coded data from said coder is produced to said coded data from said coder, a transmitter-side buffer for storing said coded data with said first time information and reading said coded data therefrom at a constant rate, and second time data adding means, coupled to said transmission-side buffer for adding second time information from said timer means indicating a time at which said coded data is transmitted to said transmission path to said coded data read from said transmission-side buffer; and said receiver section comprises:

means for detecting said second time information from said coded data transmitted through said transmission path, a receiver-side buffer for storing said coded data of said constant rate transmitted through said transmission path and reading said coded data as coded data of a variable length which includes a control code indicative of each partition of said data, means for detecting said first time information from said coded data read from said receiver-side buffer, means for detecting whether or not a total delay time of said coded data between said transmitter and receiver sections is within a predetermined delay time based on said detected first and second time information, means for controlling the phase of said coded data read from said receiver-side buffer in response to a result of the detection by said detecting means of said total delay time, and means for decoding said coded data from said controlling means to an original image data.

7. A coding and transmitting system according to claim 6, wherein said phase control means has means for causing the phase of said coded data to lead when said detected total delay time of said coded data is larger than a predetermined delay time and to lag when said total delay time is smaller than said predetermined delay time.

8. A coding and transmitting system according to claim 6, wherein said predetermined delay time is substantially equal to the sum of the delay time of said transmitter-side buffer and that of said receiver-side buffer.

9. A coding and transmitting system according to claim 6, wherein said phase control means has means for causing the phase of said coded data to lead by the amount of data unit partitioned by a control code which indicates each partition of said data when said detected total delay time of said coded data is larger by a certain amount than said predetermined delay time and to lag by the amount of data unit partitioned by the control code which indicates each partition of said data when said total delay time is smaller by said certain amount than said predetermined delay time.

10. A coding and transmitting system according to claim 9, wherein said certain amount is the amount of data unit partitioned by said control code which indicates each partition of said data.

11. A coding and transmitting system according to claim 6, wherein said means for controlling includes means for warning the operator of a phase lead or lag of said coded data in response to said total delay time of said coded data detected by said detecting means.

* * * * *